US009787180B2

(12) United States Patent
Illing et al.

(10) Patent No.: US 9,787,180 B2
(45) Date of Patent: Oct. 10, 2017

(54) HIGH SIDE SWITCH WITH CURRENT LIMIT FEEDBACK

(71) Applicant: Infineon Technologies AG, Neubiberg (DE)

(72) Inventors: Robert Illing, Villach (AT); Christian Djelassi, Villach (AT)

(73) Assignee: Infineon Technologies AG, Neubiberg (DE)

( * ) Notice: Subject to any disclaimer, the term of this patent is extended or adjusted under 35 U.S.C. 154(b) by 618 days.

(21) Appl. No.: 14/340,196

(22) Filed: Jul. 24, 2014

(65) Prior Publication Data
US 2016/0028307 A1 Jan. 28, 2016

(51) Int. Cl.
*H02M 3/156* (2006.01)
*H02M 1/32* (2007.01)

(52) U.S. Cl.
CPC ............. *H02M 3/156* (2013.01); *H02M 1/32* (2013.01)

(58) Field of Classification Search
CPC ................................ H02M 3/156; H02M 1/32
USPC ........................................................ 307/131
See application file for complete search history.

(56) References Cited

U.S. PATENT DOCUMENTS

| 4,495,536 | A | * | 1/1985 | Bynum | H02H 7/20 323/277 |
| 6,049,201 | A | * | 4/2000 | Feldtkeller | H02M 3/07 323/284 |
| 7,019,507 | B1 | | 3/2006 | Dittmer et al. | |
| 8,754,626 | B2 | | 6/2014 | Miller et al. | |
| 9,564,796 | B1 | * | 2/2017 | Ryan | H02H 3/202 |
| 2002/0125872 | A1 | * | 9/2002 | Groom | H02M 3/156 323/288 |
| 2005/0110559 | A1 | * | 5/2005 | Farkas | H02M 3/07 327/536 |
| 2006/0044843 | A1 | * | 3/2006 | Oswald | G01R 19/0092 363/19 |

(Continued)

FOREIGN PATENT DOCUMENTS

| CN | 102948058 A | 2/2013 |
| CN | 103944545 A | 7/2014 |

OTHER PUBLICATIONS

Office Action, in the Chinese language, from counterpart Chinese Application No. 201510440167.4, dated Jun. 2, 2017, 11 pages.

*Primary Examiner* — Jared Fureman
*Assistant Examiner* — Michael Warmflash
(74) *Attorney, Agent, or Firm* — Shumaker & Sieffert, P.A.

(57) ABSTRACT

Methods, devices, systems, and integrated circuits are disclosed for switching on an electrical connection to one or more loads. In one example, a switch device includes a voltage source, a power switch circuit block connected to the voltage source, and a current limitation circuit block connected to the voltage source and the power switch circuit block. The switch device further includes a voltage outlet connected to the power switch circuit block. The switch device further includes a current limit feedback circuit connected to the power switch circuit block and the current limitation circuit block. The current limit feedback circuit is configured to enable the switch device to provide a regulated connection between the power switch circuit block and the voltage outlet, wherein the regulated connection defines a current limitation mode, such that the regulated connection reduces the current in the power switch circuit block if the switch device is in the current limitation mode.

16 Claims, 5 Drawing Sheets

(56) References Cited

U.S. PATENT DOCUMENTS

| | | | |
|---|---|---|---|
| 2014/0077782 A1* | 3/2014 | Cortigiani | H03K 17/0822 323/284 |
| 2014/0217999 A1* | 8/2014 | Wibben | H02M 1/36 323/282 |
| 2015/0145495 A1* | 5/2015 | Tournatory | H02M 3/156 323/282 |
| 2015/0207401 A1* | 7/2015 | Zhang | H02M 3/158 323/271 |

* cited by examiner

HIGH SIDE SWITCH WITH CURRENT LIMIT FEEDBACK

TECHNICAL FIELD

This disclosure relates to electrical switches, and in particular, to high side switches.

BACKGROUND

High side transistor switches are often used as switches for automotive components, such as for controlling light sources or other electrically-controlled automotive components. Simple high side switches are often incorporated with additional components to form small sophisticated switch devices with many integrated functions, which may be referred to as Smart Power Switches (or SPS's). A typical SPS may have multiple integrated protection and diagnosis functions. Many embedded device functions require different circuits and sensors. An SPS may incorporate protection functions in the form of a current limitation circuit.

A typical high side switch may have low resistance (i.e., a low-ohmic switch, e.g., of less than 20 milliohms (mOhm)) and may use a double-diffused metal-oxide-semiconductor (DMOS) transistor. For a low-ohmic high side switch, the DMOS transistor typically requires a high charging current for the transistor gate. This is especially true for a high side switch with a fast slew rate (SR), i.e., a high limiting rate of change of the output voltage. Such high slew rates are typically needed for low-ohmic devices and/or higher operating voltages (e.g., a truck operating at greater than 24 volts), where it is desirable to alter the output voltage quickly over a large voltage range. The high side switch is typically designed with a large charge pump circuit to provide a high operating current, to provide the needed high charging current for the transistor gate and to drive the fast switching of output voltage required of the high side switch.

SUMMARY

In general, various examples of this disclosure are directed to a high side switch that includes a current limit circuit that includes a feedback circuit configured to provide feedback to the power switch circuit. A high side switch with a current limit feedback circuit of this disclosure can operate in the high current output range with a reduced charging current, which may be reduced by 50 percent compared with a comparable traditional high side switch, for example. This reduced charging current in a current limitation mode may further enable a high side switch of this disclosure to switch on with reduced power and reduced or eliminated risk of overheating and shutting down when switching on, among other advantages.

One example is directed to a switch device. The switch device includes a voltage source, a power switch circuit block connected to the voltage source, and a current limitation circuit block connected to the voltage source and the power switch circuit block. The switch device further includes a voltage outlet connected to the power switch circuit block. The switch device further includes a current limit feedback circuit connected to the power switch circuit block and the current limitation circuit block. The current limit feedback circuit is configured to enable the switch device to provide a regulated connection between the power switch circuit block and the voltage outlet, wherein the regulated connection defines a current limitation mode. This regulated connection reduces the current in the power switch circuit block if the switch device is in the current limitation mode.

Another example is directed to a high side switch system. The high side switch system includes a voltage source, a power switch circuit block connected to the voltage source, and a current limitation circuit block connected to the voltage source and the power switch circuit block. The high side switch system further includes a voltage outlet connected to the power switch circuit block. The high side switch system further includes a means for switching on a regulated connection between the power switch circuit block and the voltage outlet. This regulated connection reduces the current in the power switch circuit block if the high side switch system is in the current limitation mode.

Another example is directed to a method for switching a voltage source. The method includes receiving an initial current via a voltage source. The method further includes applying current from the voltage source to a power switch circuit block. The method further includes applying current from the power switch circuit block to a current limitation circuit block. The method further includes mirroring current from the current limitation circuit block to the power switch circuit block. The method further includes applying current from the power switch circuit block to a voltage outlet. This regulation reduces the current in the power switch circuit if the device is in the current limitation mode.

The details of one or more examples of this disclosure are set forth in the accompanying drawings and the description below. Other features, objects, and advantages of this disclosure will be apparent from the description and drawings, and from the claims.

DETAILED DESCRIPTION

Figure 1:
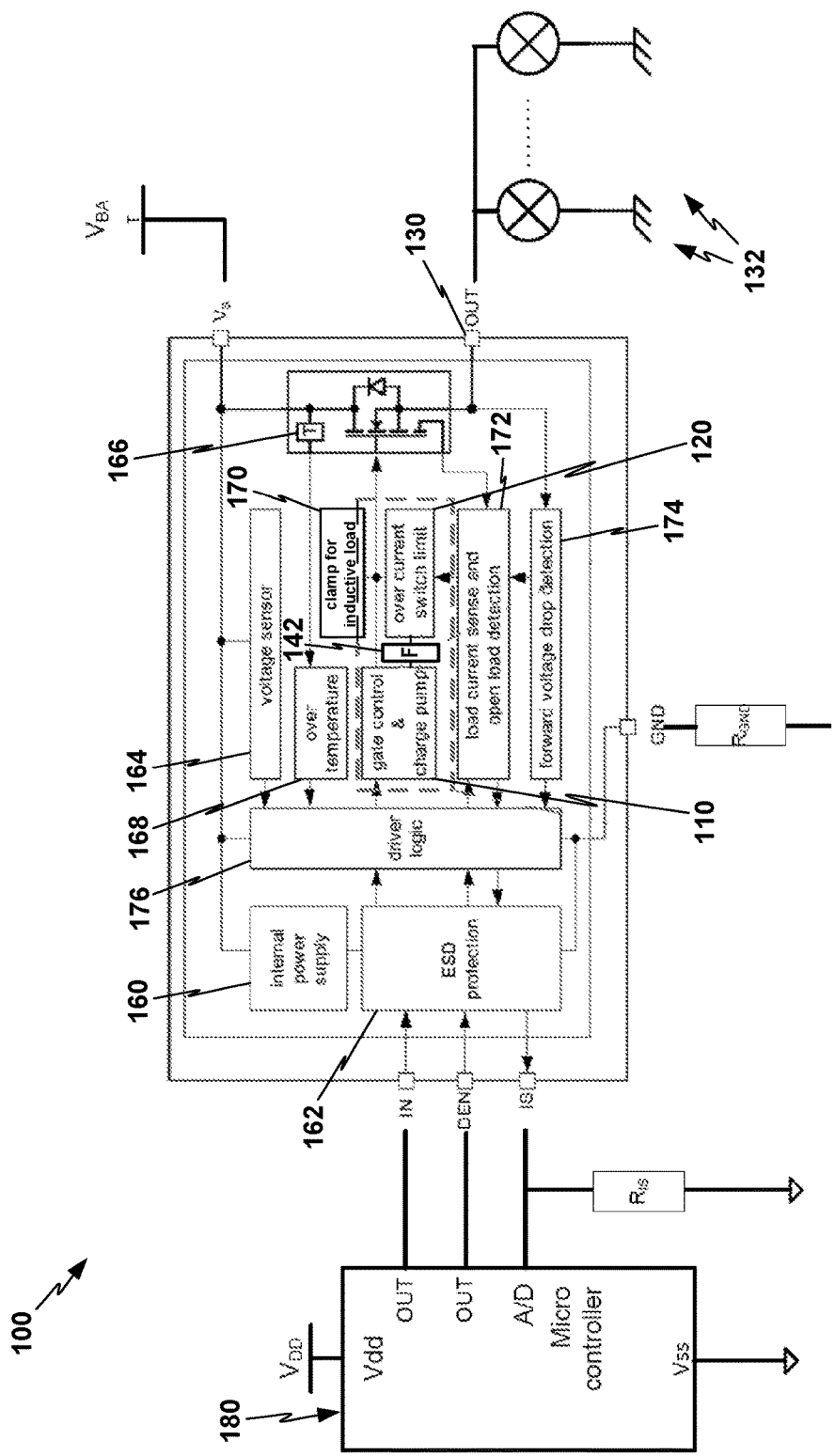
FIG. 1 is a functional block diagram illustrating a high side switch with a current limit feedback circuit block, in accordance with an example of this disclosure.

FIG. 1 is a functional block diagram illustrating a high side switch 100 with a current limit feedback circuit 142 of this disclosure, according to one example. High side switch 100 includes a power switch circuit block 110, a current limitation circuit block 120, and a current limit feedback circuit 142. Power switch circuit block 110 is configured for gate control and charge pump functions, and current limitation circuit block 120 is configured for current limitation functions when high side switch 100 operates in a current limitation mode, as further described below. Current limit feedback circuit 142 defines a current limitation mode at a selected high current range, such as when connected to a short circuit load. Current limit feedback circuit 142 enables high side switch 100 to switch on, in the current limitation mode, with a regulated connection that provides reduced charging current, reduced power, and reduced or eliminated risk of overheating and shutting down instead of switching on successfully, among other advantages, as further described below.

High side switch 100 in the example of FIG. 1 also includes an internal power supply 160, an electrostatic discharge (ESD) protection circuit block 162, a voltage sensor 164, a temperature sensor 166, a high temperature protection circuit 168, an inductive load clamp 170, a load current sense and open load detection circuit block 172, a forward voltage drop detection circuit block 174, and a driver logic circuit block 176. High side switch 100 has a voltage outlet 130 connected to a number of loads 132, such as light bulbs, for example, and further features as depicted in the example of FIG. 1. High side switch 100 is also operatively coupled to a microcontroller 180 that may transmit control signals to high side switch 100, such as a signal to switch on to activate loads 132. Current limit feedback circuit 142 may mirror current between current limitation circuit block 120 and a reference current line of power switch circuit block 110. Current limit feedback circuit 142 may enable high side switch 100 have a regulated connection between power switch circuit block 110 and voltage outlet 130 while power switch circuit block 110 is in the current limitation mode. This regulation reduces the current in the power switch circuit if the device is in the current limitation mode, as further described below.

Figure 2:
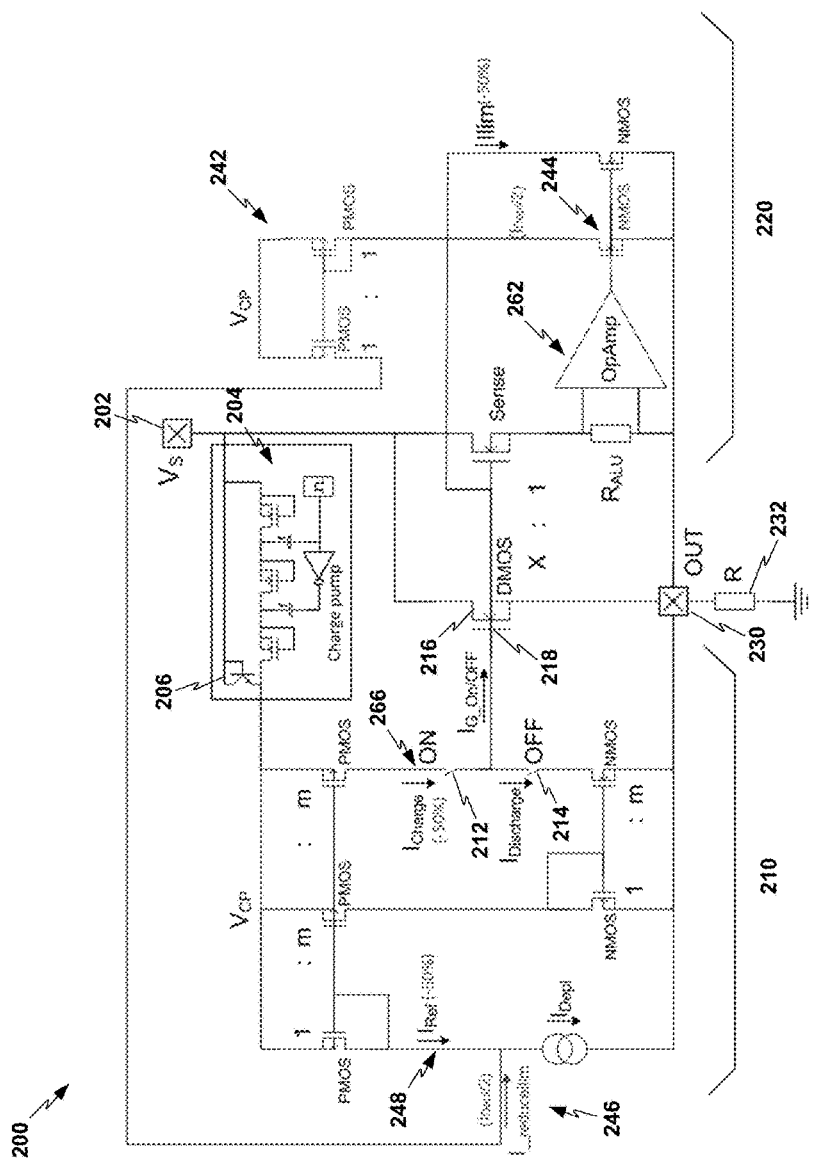
FIG. 2 is a functional block diagram illustrating a high side switch with a current limit feedback circuit block, in accordance with an example of this disclosure.

FIG. 2 is a functional block diagram illustrating a high side switch 200 with a current limit feedback circuit 242 of this disclosure, according to one example. The example of FIG. 2 omits some detail shown in FIG. 1 while illustrating a power switch circuit block 210, a current limitation circuit block 220, and a current limit feedback circuit 242 in more detail. High side switch 200 includes a voltage source 202, a charge pump 204, a bipolar junction transistor 206, a power switch block 210, a charging switch 212, a discharging switch 214, a DMOS 216 with a DMOS gate 218, a current limitation block 220, a load output 230, and a current limit feedback circuit 242. FIG. 2 also shows one or more loads 232 coupled to voltage outlet 230. Power switch block 210 controls the DMOS gate 218 to switch the load current to load output 230 on and off. In particular, charging switch 212 is turned on and discharging switch 214 is turned off to direct current from voltage source 202 through charge pump 204 and/or bipolar junction transistor 206 to DMOS gate 218. Current limitation block 220 controls the maximum current through DMOS 216, which enforces a maximum current to load output 230 and to a load coupled to load output 230. Current limit feedback circuit 242 enables the charging current for DMOS gate 218 to be reduced, relative to a traditional high side switch, when the load current is being limited by current limitation block 220. In particular, current limit feedback circuit 242 provides a regulated connection that defines a current limitation mode by mirroring the regulation current or limiting current $I_{lim}$ from the current limitation block 220, and providing this mirror current $I_{limreduce}$ to power switch block 210.

High side switch 200 may be configured to operate in different modes, including a current limitation mode and a low current mode, depending on whether a charging current $I_{CHARGE}$ in the power switch circuit block 210 is lower or higher depending on the source-to-drain voltage $V_{ds}$ of DMOS 216, which may be 1 $V_{ds}$ volt, in one example. The current of the low current mode depends on voltage at the time. In one example of the low current mode (also referred to as the on resistance or $R_{on}$ mode, or maximum voltage mode), high side switch 200 may operate at 6 volts and a current of less than approximately 500 microamps (μA), or be designed to provide 6 volts at its outlet for supplying components intended to operate at 6 volts, in this example. In another example, the low current mode may apply when high side switch is operating below only approximately 80 μA when the voltage is below approximately 0.8 V. In another example, a high side switch may operate at 24 volts, or at a selected voltage generally between 1 and 50 volts, or at any other voltage level typical in industry. High side switch 200 may be configured to operate in the low current mode when the source voltage $V_{ds}$ is within nominal operating ranges, such as during switch on with a typical, low-current load (e.g., less than approximately 500 μA) connected to load output 230. In the low current mode, high side switch 200 may respond to a switch on signal (e.g., from microcontroller 180 as in FIG. 1) by applying current from the source voltage $V_{ds}$ from voltage source 200 (from, e.g., a battery) to the outlet 230, with DMOS 216 switched on, and with a high voltage difference (higher than the threshold voltage) and a low current, such as around 50 microamps (μA) in one example.

On the other hand, high side switch 200 may be configured to operate in the current limitation mode when the source-to-drain voltage $V_{ds}$ is higher. In one example in the current limitation mode, high side switch 200 may operate at 0.5 volts, and at currents ranging up to around 60 amps, which may be constrained by a current limitation mode provided by the current limitation circuit block 220, which prevents a greater current than this through high side switch 200. In the current limitation mode, high side switch 200 may respond to a switch on signal by activating charge pump 204, and conducting current both from charge pump 204 to DMOS gate 218 (referred to as charging current $I_{CHARGE}$) and from voltage source 202 to DMOS 216 (referred to as source current $I_{ds}$), with DMOS 216 off initially, allowing high side switch 200 to build up charge and voltage before switching DMOS 216 on. High side switch 200 draws current from charge pump 204 to DMOS gate 218, raising the voltage of DMOS gate 218 higher than the source voltage Vds of voltage source 202. By building up charge and voltage initially prior to turning DMOS 216 on, high side switch 200 may avoid applying insufficient voltage at outlet 230 for the initial inrush current to one or more loads. After a threshold voltage $V_{th}$ has accumulated at DMOS gate 218, high side switch 200 may trigger DMOS gate 218 to open DMOS 216 and supply charging current $I_{CHARGE}$ to outlet 230.

A traditional high side switch, even a traditional high side switch that incorporates a large charge pump and accumulates charge prior to applying a voltage at its outlet, may still experience charge breakdown and apply insufficient voltage at the outlet, potentially leading to a high power spike, overheating, and shutdown, and/or insufficient inrush current supplied to the load. Typical high side switches may be designed to provide sufficient inrush current by including a larger charge pump with a larger operating current. Designing a charge pump with increased output current typically requires increasing the number of pump capacitors it includes and/or to increasing its charge pump frequency. However, increasing the charge pump frequency comes at a cost of decreased electromagnetic compatibility (EMC) and increased electromagnetic emission (EME). Thus, it is typically preferred to increase the output current of a charge pump by designing it with a high number of pump capacitors, which leads to high bulk and weight. Even with this additional size, the high side switch still typically switches with a non-linear relation of source current to source voltage, with the source current faltering or breaking down before switching is complete. High side switch 200 of this disclosure may avoid these performance problems, and apply sufficient voltage at outlet 230 without applying excessive charging current through power switch circuit block 210, among other advantages.

In high side switch 200, once the charge current in the power switch block 210 reaches or exceeds a certain value (e.g., the limitation current $I_{lim}$ in the current limitation block, in a traditional high side switch), the high side switch 200 may initiate a discharge of DMOS 216, thereby switching on a connection or current regulation between the power switch circuit block and the voltage outlet, and begin supplying current to outlet 230. High side switch 200 also regulates the current with current limitation circuit block 220. If the charge pump 204 cannot deliver the required charging current via outlet 230 to the one or more loads 232, the charge pump voltage may falter, become variable, or break down, dropping and reducing the DMOS gate voltage and the load current (as further described below). High side switch 200 might typically be designed to power several loads 232. The limiting current $I_{lim}$ may vary until the charge pump voltage $V_{CP}$ rises above the threshold voltage, thereby enabling the source current $I_{ds}$ to flow from the source 202 to the outlet 230. Thus, in the traditional high side switch, the charging current may reach high levels at high voltage (e.g., 100 amps at greater than about 0.8-1.0 volt), which means high power and potentially higher temperature in the high side switch, and may cause overheating and shutdown.

A high side switch 200 of this disclosure may resolve these conditions and may avoid excessive current, power, and temperature, and may avoid the attendant risk of shutdown. The current limitation block 220 prevents the current passing through DMOS 218 from exceeding a certain maximum value. In a traditional high side switch, the limitation current $I_{lim}$ in the current limitation block 220 is defined by the size of the DMOS and by the slew rate current. A high side switch 200 of this disclosure includes a current limit feedback circuit 242. Current limit feedback circuit 242 may enable high side switch 200 to operate power switch circuit block 210 with significantly reduced current in the current limitation mode or current limitation state, e.g., with $V_{ds}$ above about 0.8-1.0 volt, such that the current is limited to about 50% lower, compared to a traditional high side switch without current limit feedback circuit 242. Current limit feedback circuit 242 may enable high side switch 200 to switch on a regulated connection through DMOS 218 between the power switch circuit block 210 and the voltage outlet 230 while the power switch circuit block 210 is in the current limitation mode defined by current limitation circuit block 220. High side switch 200 may therefore maintain a relatively higher limitation current and thus higher slew rate current and high performance in applying sufficient voltage quickly via outlet 230 to one or more loads, but do so with a lower charge current, and thus with a smaller charge pump, with lower current and power usage, and less risk of high temperature and potential overheating, circuit breaker breakdown, and shutdown, among other advantages.

In particular, current limit feedback circuit 242 may mirror current between current limitation circuit block 220 and power switch circuit block 210. In the example of FIG. 2, current limitation circuit block 220 includes an operational amplifier (op-amp) 262, and an re-channel MOSFET (NMOS) transistor 244 with its gate connected to an output of op-amp 262 and with a connecting line to current limit feedback circuit 242. Power switch circuit block 210 includes a reference line 248 that carries a reference current for power switch circuit block 210. High side switch 200 includes a connecting line between current limit feedback circuit 242 and reference line 248 of power switch circuit block 210. Current limit feedback circuit 242 includes two symmetrical PMOS transistors, in this example, configured such that connecting lines of one of each of the PMOS transistors is connected to NMOS transistor 244 in current limitation circuit block 220 and reference line 248. In this way, current limit feedback circuit 242 mirrors the current between current limitation circuit block 220 and reference line 248 of power switch circuit block 210. This mirroring of current may reduce the reference current on reference line 248, such as by 50%, in this example. The charging current on charging current line 266 is dependent on the reference current on reference line 248, and current limitation circuit block 220 is configured such that the reduction in the reference current on reference line 248 also causes a reduction in the charging current on charging current line 266. Current limit feedback circuit 242 may thus enable high side switch 200 to switch on a regulated connection between power switch circuit block 210 and voltage outlet 230 while power switch circuit block 210 is in the current limitation mode defined by current limitation circuit block 220, in this example.

Once the source voltage $V_{ds}$ rises above the threshold voltage, power switch circuit block 210 transfers the source current from the charge pump 204 to a bipolar junction transistor 206 in parallel to the charge pump 204. Power switch circuit block 210 thus supplies the source voltage $V_{ds}$ from the battery through the bipolar junction transistor to raise the charge current the rest of the way up to the target current to apply to DMOS gate 218. During the initial flow of current, the flow of current into high side switch 200 from source 202 may be divided between the DMOS gate 218 and the current limitation circuit block 220. In a traditional high side switch, dependence of the source current on the source voltage may cause a reduced load switching. In one typical example, a low-ohmic high side switch with limiting current $I_{lim}$ dependent on source current Ids may have a resistance of 12 milliohm (mOhm) and a source voltage Vds of about 4 volts, and would be unable to switch some typical loads such as bulbs that may require a switching inrush current of 100 amps. High side switch 200 with current limit feedback circuit 242 of this disclosure may switch on with a reduced charging current, and thereby with reduced power and reduced or eliminated risk of overheating and shutting down instead of switching on successfully, among other advantages.

A current limit feedback circuit of this disclosure may thus reduce the required DMOS charge current when operating in a current limitation mode. The current limit feedback circuit 242 mirrors the current from the current limitation block 220 to the power switch block 210, and reduces the load current for the DMOS gate 218 to a selected lower value than in typical high side switches, such as 50% lower in one example. The current limit feedback circuit 242 enables high side switch 200 to operate in the current limitation state with a lower current. This lower load current enables high side switch 200 to function with a lower charge pump current, and therefore to be designed with a charge pump with less charge pump capacity and therefore resulting in lower cost and lower EME of high side switch 200. High side switch 200 may operate with a slew rate and with an $R_{on}$ mode that may not be affected by the lower load current enabled by the current limit feedback circuit. High side switch 200 may provide a higher inrush current to one or more loads 232 due to the advantages enabled by the current limit feedback circuit, such as about a 25% higher inrush current, in one example. Typical high side switches may also exhibit a non-linear relation of source current to source voltage and the breakdown of the charging current before switching is complete. High side switch 200 with current limit feedback circuit 242 of the example of FIG. 2 may resolve the non-linear relation of source current to source voltage and the breakdown of the charging current of typical high side switches. Operational aspects of high side switch 200 with current limit feedback circuit 242 of the example of FIG. 2 are further described below with reference to FIG. 3.

Figure 3:
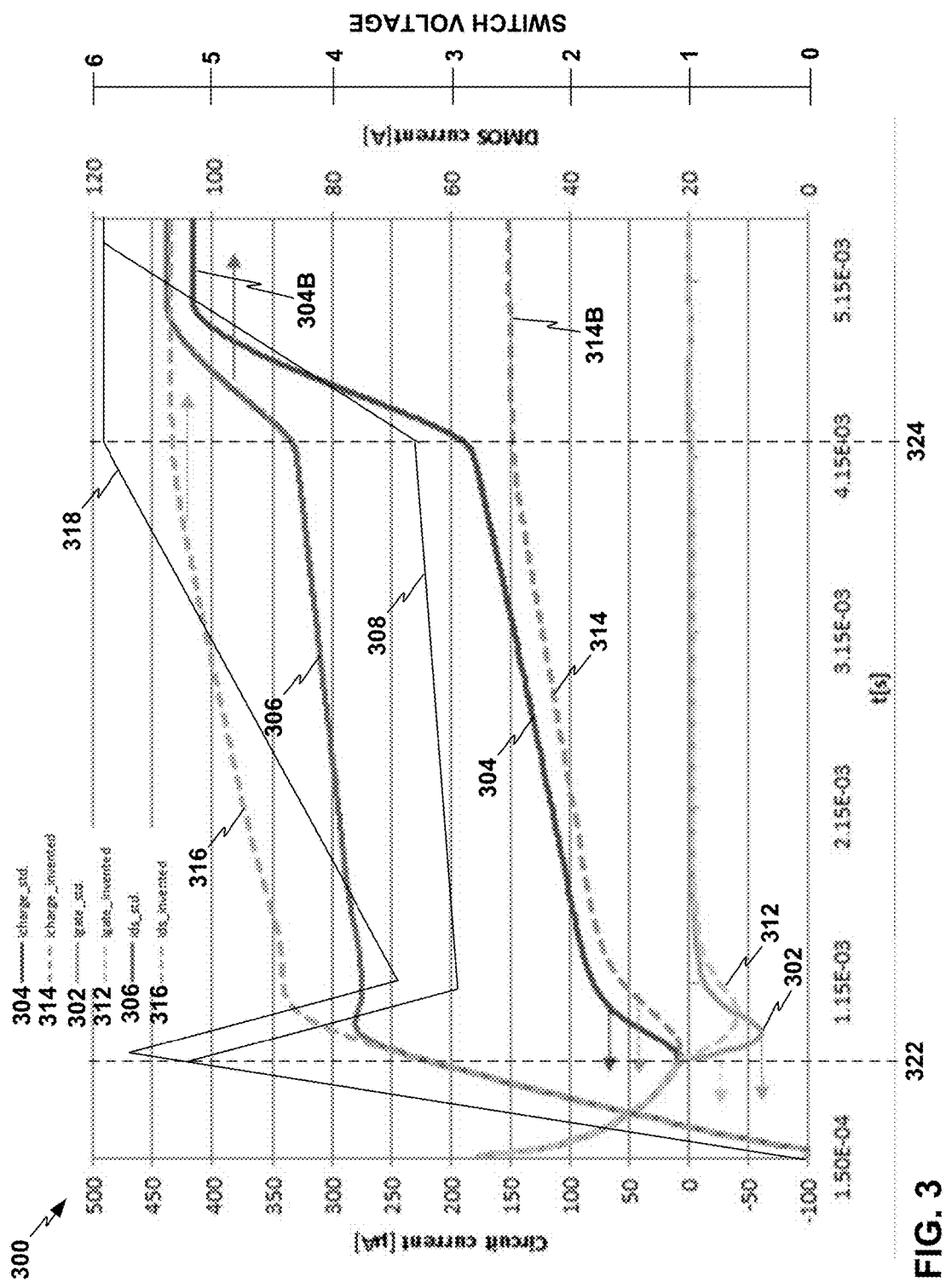
FIG. 3 depicts a graph that shows current flows over time during switching on a short circuit load of a high side switch of FIG. 2 in comparison with current flows of a typical traditional high side switch, according to one example.

FIG. 3 depicts a graph 300 that shows current flows over time during switching on a short circuit load of a high side switch 200 of FIG. 2 in comparison with current flows of a typical traditional high side switch, according to one example, to illustrate advantages of the present disclosure. In particular, graph 300 shows traditional switch DMOS gate current 302, traditional switch charging current 304, traditional switch source current 306, and traditional switch voltage 308, i.e., charge pump voltage $V_{CP}$ minus source outlet voltage $V_{SO}$, all of an example traditional high side switch. Graph 300 further shows mirrored switch DMOS gate current 312, mirrored switch charging current 314 (e.g., through charging current line 266 of power switch circuit block 210 of FIG. 2), mirrored switch source current 316, and switch voltage 318 (e.g., at voltage outlet 230 in FIG. 2) in a mirrored high side switch 200 with current limit feedback circuit 242 as in FIG. 2. DMOS gate current 302/312 and charging current 304/314 are measured in microamps as measured by the left-side y-axis, scaled from −100 to 500 microamps (μA), while source current 306/316 is measured in amps as measured by the right-side y-axis, scaled from 0 to 120 amps (A). Switch voltage is measured in volts as indicated by the farther right-side y-axis, scaled from 0 to 6 volts.

As graph 300 shows, for both circuits, DMOS gate current 302/312 initially descends while source current 306/316 initially rises at an essentially constant rate, until transition 322 when DMOS gate current 302/312 opens the DMOS gate 218 (in FIG. 2), and charging current 304/314 separates from DMOS gate current 302/312, enters current limitation circuit block 220, and begins rising. Mirrored switch DMOS gate current 312 stabilizes at a constant value more quickly than traditional switch DMOS gate current 302, and mirrored switch charging current 314 rises more slowly than traditional switch charging current 304. Traditional switch source current 306 begins faltering or breaking down in its increase at transition 322, and continues increasing at a significantly reduced rate soon after transition 322 until transition 324, when traditional switch charging current 304 spikes or increases at a higher rate and traditional switch source current 306 increases at a higher rate to finish rising to its target value. Mirrored switch source current 316, on the other hand, continues rising at its initial constant rate for longer after transition 322, and is closer to its target value when it levels out into a lower rate of increase. The difference between mirrored switch source current 316 and traditional switch source current 306 is further illustrated in FIG. 4, as measured with respect to voltage rather than time.

Figure 4:
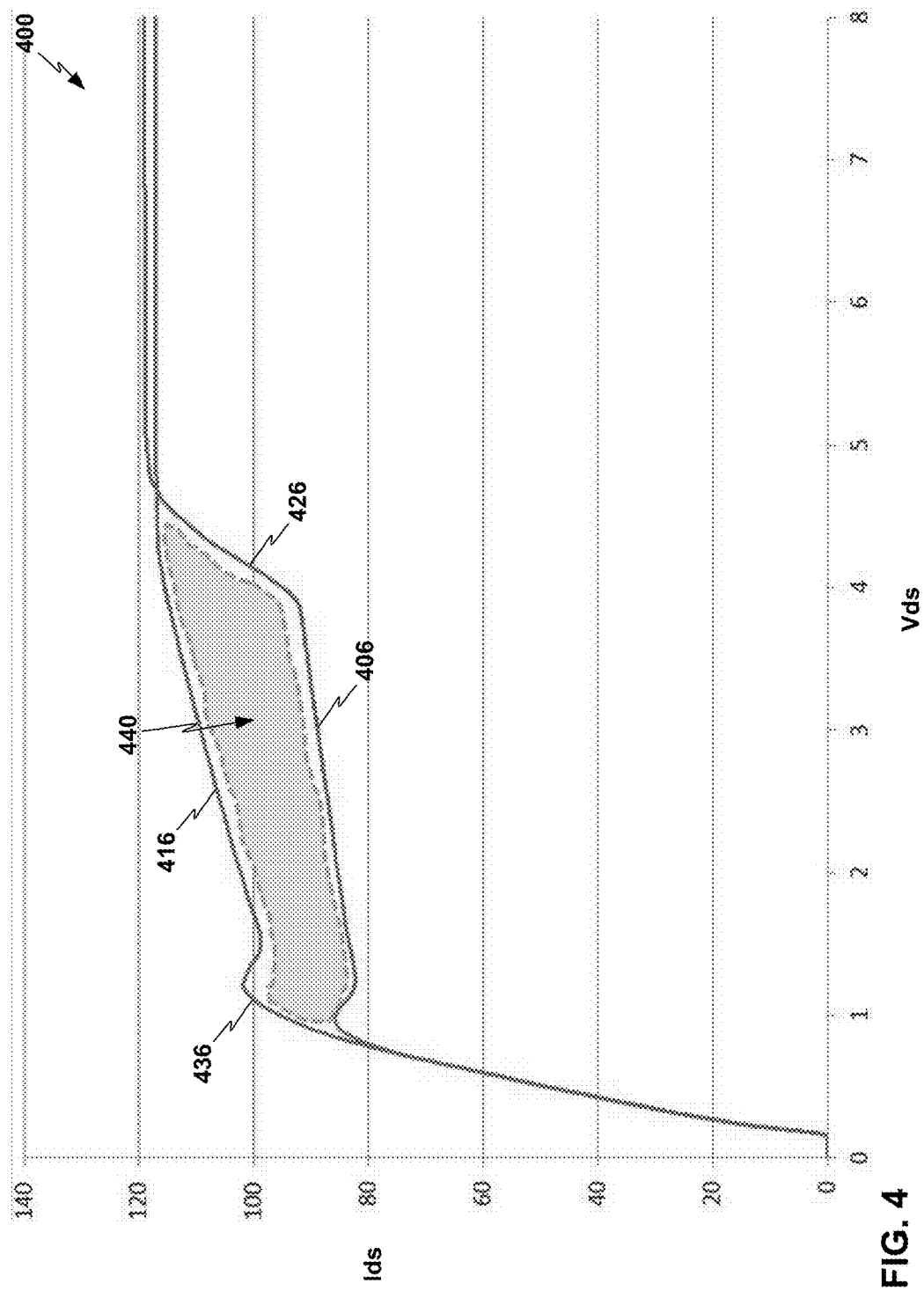
FIG. 4 shows a graph of switch source current in relation to voltage for a high side switch with current limit feedback circuit of this disclosure in comparison to a traditional high side switch while switching a short circuit load.

FIG. 4 shows a graph 400 of switch source current in relation to voltage, as opposed to current over time, for a high side switch with current limit feedback circuit of this disclosure (shown at 416) in comparison to a traditional high side switch (shown at 406) while switching a short circuit load. As graph 400 shows, a high side switch of this disclosure enables switching one or more loads that require a current of 100 amps already at only a little over 1 volt (shown at transition point 436), while a traditional high side switch does not enable switching one or more loads that require a current of 100 amps until it reaches over 4 volts (shown at transition point 426). The dashed area 440 marks a difference in integrated current relative to voltage between a traditional high side switch and a high side switch of this disclosure, which represents savings in power surge or power dissipation within the switch, and which represents advantage of a high side switch of this disclosure in switching capability.

Figure 5:
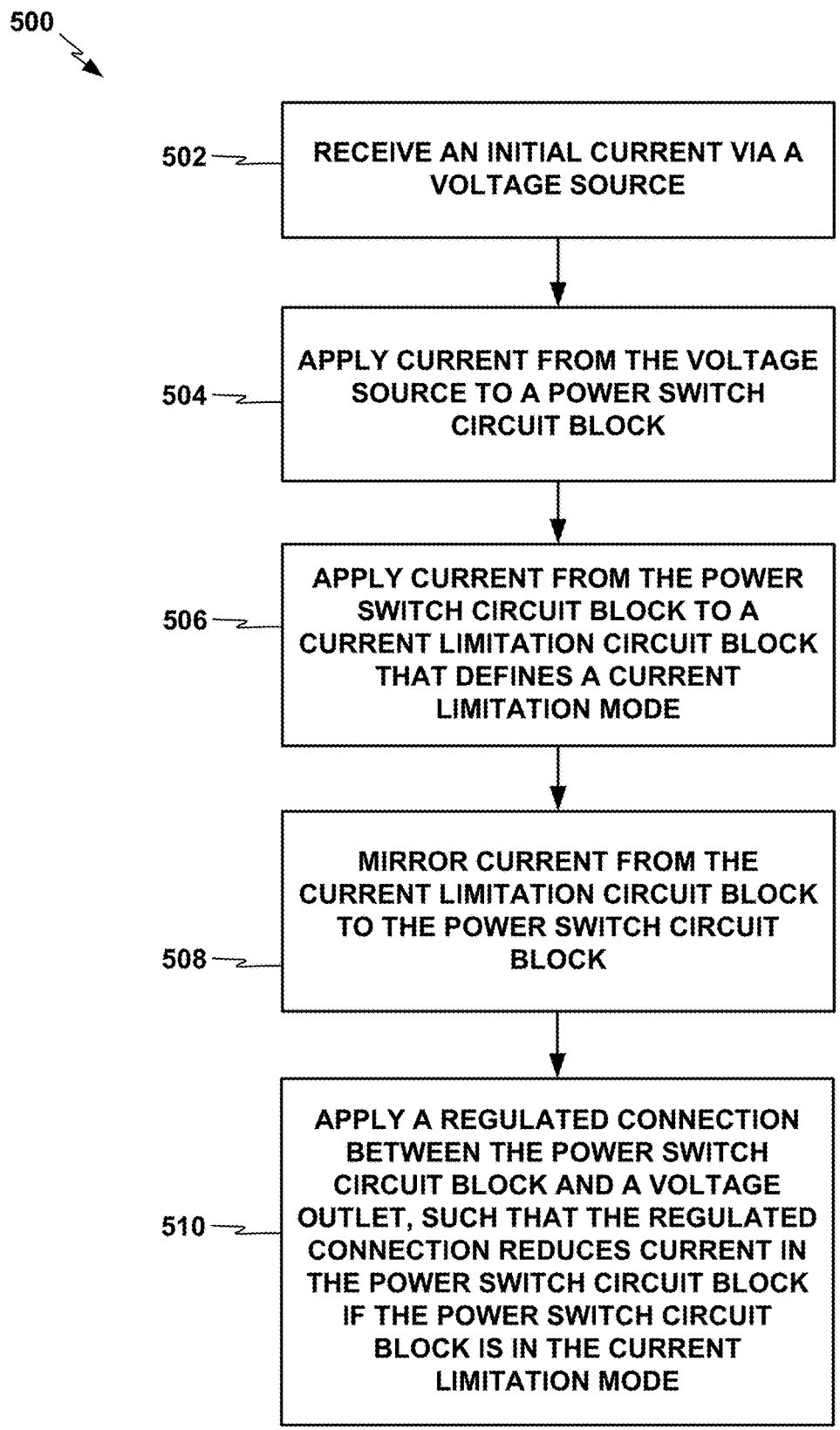
FIG. 5 is a flowchart illustrating a method for switching a voltage source with a high side switch such that the power switch circuit block is regulated by the current limitation circuit in the current limitation mode, among other advantages, in accordance with an example of this disclosure.

FIG. 5 is a flowchart illustrating a method 500 for switching a voltage source with a high side switch such that the power switch circuit block has a lower current than the current limitation circuit block, among other advantages, in accordance with an example of this disclosure. Method 500 may be a more generalized form of the operation of various high side switches of this disclosure, including high side switches 100 and 200 as described above with reference to FIGS. 1 and 2 and/or high side switches with operating characteristics such as those described above with reference to graphs 300 and 400 of FIGS. 3 and 4.

In the example of FIG. 5, method 500 includes receiving an initial current via a voltage source (e.g., receiving an initial voltage via voltage source 202 in response to a control signal to switch on as described with reference to FIGS. 1 and 2) (502). Method 500 further includes applying current from the voltage source to a power switch circuit block (e.g., applying the voltage from the voltage source to charge pump 204 and applying current from charge pump 204 to DMOS gate 218 as described above with reference to FIG. 2, and leading up to transition 322 shown in graph 300 as described above with reference to FIG. 3) (504). Method 500 further includes applying current from the power switch circuit block to a current limitation circuit block that defines a current limitation mode (e.g., switching on DMOS 216 and applying a regulated connection between DMOS 216 and current limitation circuit block 220 as described with reference to FIG. 2, between transitions 322 and 324 as described with reference to FIG. 3) (506).

Method 500 further includes mirroring current from the current limitation circuit block to the power switch circuit block (e.g., applying current through current limit feedback circuit 242 between current limitation circuit block 220 and reference line 248 of power switch circuit block 210 as described with reference to FIG. 2, also beginning after transition 322 as described with reference to FIG. 3) (508). Method 500 further includes applying a regulated connection between the power switch circuit block and a voltage outlet, such that the regulated connection reduces current in the power switch circuit block if the power switch circuit block is in the current limitation mode (e.g., applying current to outlet 130, 230 and thereby to one or more loads 132, 232 as described above) (510).

Any of the circuits, devices, and methods described above may be embodied in or performed in whole or in part by any of various types of integrated circuits, chip sets, and/or other devices, and/or as software executed by a computing device, for example. This may include processes performed by, executed by, or embodied in one or more microcontrollers, field-programmable gate arrays (FPGAs), programmable logic devices (PLDs), central processing units (CPUs), processing cores, or any other configuration of hardware and/or software. For example, a high side switch with current limit feedback circuit of this disclosure may be implemented or embodied as an integrated circuit configured, via any combination of hardware, logic, general purpose processors, application specific integrated circuits (ASICs), field programmable gate arrays (FPGAs), and/or general processing circuits, which may execute software instructions in some examples, to perform various functions described herein.

Various examples of the invention have been described. These and other examples are within the scope of the following claims.

What is claimed is:

1. A switch device comprising:
a voltage source;
a power switch circuit block connected to the voltage source, wherein the power switch circuit block comprises a charge pump and a transistor, and wherein the charge pump is configured to output current to drive a gate terminal of the transistor of the power switch circuit block;
a current limitation circuit block connected to the voltage source and the power switch circuit block;
a voltage outlet connected to the power switch circuit block; and
a current limit feedback circuit connected to the power switch circuit block and the current limitation circuit block, wherein the current limit feedback circuit is configured to provide a regulated connection between the power switch circuit block and the voltage outlet according to a current limitation mode wherein current output by the charge pump to drive the gate terminal of the transistor of the power switch circuit block is reduced, by a factor that is a function of magnitude of current output by the current limit feedback circuit to the power switch circuit block, as compared to current output by the charge pump to drive the gate terminal of the transistor of the power switch circuit block according to a mode other than the current limitation mode.

2. The switch device of claim 1, wherein the power switch circuit block comprises a reference current line, and wherein the current limit feedback block comprises a current mirror configured to mirror current between the current limitation circuit block and the reference current line of the power switch circuit block.

3. The switch device of claim 1, wherein the the current limit feedback circuit is configured to switch on a connection between the power switch circuit block and the voltage outlet while the switch device is in the current limitation mode.

4. The switch device of claim 1, wherein the power switch circuit block comprises a double-diffused metal-oxide-semiconductor (DMOS) transistor switch and a DMOS switch gate for switching the DMOS switch, and the DMOS transistor switch is configured to form the connection between the voltage source and the voltage outlet.

5. The switch device of claim 1, wherein the switch device is configured to operate in the current limitation mode or in a low charge mode, wherein the current limit feedback circuit is configured to enable the switch device to switch on the connection between the voltage source and the voltage outlet when the switch device is operating in the current limitation mode.

6. The switch device of claim 1, wherein the current limitation circuit block includes an operational amplifier (op-amp) and an n-channel MOSFET (NMOS) transistor, the NMOS transistor comprises:

a gate connected to an output of the op-amp; and
a connecting line connected to the current limit feedback circuit.

7. The switch device of claim 1, wherein the power switch circuit block comprises a reference line that carries a reference current for the power switch circuit block, the switch device further comprising:
a connecting line between the current limit feedback circuit and the reference line comprised in the power switch circuit block.

8. The switch device of claim 1, wherein the current limit feedback circuit comprises a first p-channel MOSFET (PMOS) transistor and a second p-channel MOSFET (PMOS) transistor, wherein the first PMOS transistor is operatively connected to an NMOS transistor comprised in the current limitation circuit block; and the second PMOS transistor is connected to a reference line comprised in the power switch circuit block.

9. A high side switch system comprising:
a voltage source;
a power switch circuit block connected to the voltage source, wherein the power switch circuit block comprises a charge pump and a transistor, and wherein the charge pump is configured to output current to drive a gate terminal of the transistor of the power switch circuit block;
a current limitation circuit block connected to the voltage source and the power switch circuit block;
a voltage outlet connected to the power switch circuit block; and
a means for switching on a regulated connection between the power switch circuit block and the voltage outlet according to a current limitation mode wherein current output by the charge pump to drive the gate terminal of the transistor of the power switch circuit block is reduced, by a factor that is a function of magnitude of current output by the means for switching on the regulated connection between the power switch circuit block and the voltage outlet to the power switch circuit block, as compared to current output by the charge pump to drive the gate terminal of the transistor of the power switch circuit block according to a mode other than the current limitation mode.

10. The high side switch system of claim 9, wherein the power switch circuit block comprises a reference current line, and wherein the means for switching on the connection between the power switch circuit block and the voltage outlet while the power switch circuit block has a lower current than the current limitation circuit block comprises means for mirroring current between the current limitation circuit block and the reference current line of the power switch circuit block.

11. The high side switch system of claim 9, wherein the means for switching on the connection between the power switch circuit block and the voltage outlet while the power switch circuit block has a lower current than the current limitation circuit block comprises means for switching on a connection between the power switch circuit block and the voltage outlet while the charge pump has a lower current than the current limitation circuit block.

12. The high side switch system of claim 9, wherein the power switch circuit block comprises a reference line that carries a reference current for the power switch circuit block, wherein the means for switching on the connection between the power switch circuit block and the voltage outlet while the power switch circuit block has a lower current than the current limitation circuit block comprises means for connecting the current limit feedback circuit and the reference line comprised in the power switch circuit block.

13. A method for switching a voltage source, the method comprising:

activating a charge pump, of a power switch circuit block that is connected to the voltage source, that is configured to output current to drive a gate terminal of a transistor of a power switch device;

mirroring current from a current limitation circuit block to the power switch circuit block; and applying a regulated connection between the power switch circuit block and a voltage outlet according to a current limitation mode wherein current output by the charge pump to drive the gate terminal of the transistor of the power switch circuit block is reduced, by a factor that is a function of magnitude of current output by a current limit feedback circuit to the power switch circuit block, as compared to current output by the charge pump to drive the gate terminal of the transistor of the power switch circuit block according to a mode other than the current limitation mode.

14. The method of claim 13, wherein the power switch circuit block comprises a reference current line, and wherein the current limit feedback block is configured to mirror current between the current limitation circuit block and the reference current line of the power switch circuit block.

15. The method of claim 13, the method further comprising switching on a connection between the charge pump and the voltage outlet while the power switch circuit block is in the current limitation mode.

16. The method of claim 13, wherein the power switch circuit block comprises a reference line that carries a reference current for the power switch circuit block, the method further comprising connecting the current limit feedback circuit and the reference line comprised in the power switch circuit block.

* * * * *